United States Patent [19]

Anderson et al.

[11] Patent Number: 4,936,390
[45] Date of Patent: Jun. 26, 1990

[54] TOOL APPARATUS WITH TOOL ATTACHED TO END OF OUTRIGGER ARM

[75] Inventors: Jack F. Anderson, Marion, N. Dak.; Jeffrey N. Anderson, Moorehead, Minn.

[73] Assignee: Town & Country Research & Development, Inc., Litchville, N. Dak.

[21] Appl. No.: 938,269

[22] Filed: Dec. 5, 1986

[51] Int. Cl.⁵ .................... A01B 33/06; A01B 63/102
[52] U.S. Cl. .......................................... 172/5; 172/47; 172/68; 172/91; 172/96; 172/98; 172/111; 172/305; 172/451
[58] Field of Search .................... 172/5, 6, 91, 98, 99, 172/110, 111, 120, 233, 234, 235, 236, 305, 308, 446, 451, 743, 776, 810, 817

[56] References Cited

U.S. PATENT DOCUMENTS

| | | | |
|---|---|---|---|
| 2,027,910 | 1/1936 | Herring | 172/94 |
| 2,429,298 | 10/1947 | Savage | 172/96 |
| 2,601,366 | 6/1952 | Chapman | 30/379 |
| 2,619,017 | 11/1952 | Stephenson | 172/49.5 |
| 2,622,500 | 12/1952 | Hugger | 172/810 |
| 2,651,246 | 9/1953 | Peters et al. | 172/59 |
| 2,662,561 | 12/1953 | Duncan | 30/379 |
| 2,718,836 | 9/1955 | Pertics et al. | 172/99 |
| 2,735,200 | 2/1956 | Arps | 172/817 |
| 2,749,824 | 6/1956 | Friday | 172/5 |
| 2,791,081 | 5/1957 | Allen et al. | 56/15.7 |
| 3,003,299 | 10/1961 | Smith et al. | 56/15.7 |
| 3,059,704 | 10/1962 | Kasatkin | 172/38 |
| 3,117,632 | 1/1964 | Caggiano, Jr. | 172/5 |
| 3,190,364 | 6/1965 | Maloney | 172/111 |
| 3,199,607 | 8/1965 | Granius | 172/111 |
| 3,200,890 | 8/1965 | Courtway | 172/111 |
| 3,419,086 | 12/1968 | Giusti et al. | 172/523 |
| 3,765,491 | 10/1973 | van der Lely et al. | 172/49.5 |
| 3,913,681 | 10/1975 | Lincoln | 172/5 |
| 4,044,839 | 8/1977 | van der Lely | 172/49.5 |
| 4,148,365 | 4/1979 | Anderson | 172/817 X |
| 4,224,997 | 9/1980 | van der Lely | 172/59 |
| 4,316,509 | 2/1982 | Hallum | 172/451 X |
| 4,489,791 | 12/1984 | Schneider | 172/776 |
| 4,518,043 | 5/1985 | Anderson et al. | 172/6 |

FOREIGN PATENT DOCUMENTS 2400894 7/1974 Fed. Rep. of Germany ...... 172/446

OTHER PUBLICATIONS

Promotional brochure "Wee"–Badger–undated, Weed Badger, Fargo, ND 58102.
Promotionasl brochures (3)–"Weed Badger 2550-ss'-'–all undated, Weed Badger, Fargo, ND 58102.

Primary Examiner—Richard T. Stouffer
Attorney, Agent, or Firm—James R. Young

[57] ABSTRACT

A three-point hitch mounted in-row tiller has a conventional three-point hitch mounted frame member with an outrigger arm pivotally mounted to the frame member in a manner that accommodates pivotal movement of the outrigger in relation to the frame member about two orthogonal axes. Pivotal movement about one of the axes causes tilting of a working tool mounted on the outrigger arm, and pivotal movement about the other axis causes vertical lifting and depth control of the working tool. Various working tool embodiments, including several with flexible teeth, and a mechanical/hydraulic sensor apparatus are also included.

25 Claims, 8 Drawing Sheets

TOOL APPARATUS WITH TOOL ATTACHED TO END OF OUTRIGGER ARM

BACKGROUND OF THE INVENTION

1. Field of the Invention

This invention relates to agricultural and horticultural tiller apparatus, and more specifically to in-row tillers adapted for three-point hitch mounting on a tractor for tilling between plants or objects in a row.

2. Description of the Prior Art

Many years ago, the soil around plants, such as ornamental and wind break trees, fruit trees, grape vines, berry bushes, and the like that were planted in rows, were generally tilled and weeded by hand labor. Then, in the last two to three decades, such hand labor was largely replaced by chemical weed control methods. More recently, within the past several years, there has been a growing recognition that chemical weed control methods have problems of their own and that desirable plant growth suffers where there is inadequate cultivation and aeration. However, while the need for cultivation is again apparent, high labor costs in these modern times makes weeding and cultivation by hand prohibitive. Yet because of the predominate use of chemical herbicides for weed control for so many years, there was a corresponding dearth of new developments in cultivating machinery. An effective cultivator was needed that could till between trees, vines, or bushes planted in a row with automatic controls to avoid damaging the plants as well as responsive manual override controls to maximize speed and cultivation effectiveness. Also, efficient depth control and various pitch adjustments were required to make such an in-row tiller versatile and effective for use on bermed as well as flat areas.

The U.S. Pat. No. 4,518,043, invented by Jack F. Anderson, Clayton Melrose, and Floyd Melrose, issued in 1985, met many of the needs and requirements described above. It included structures and features for very effectively and efficiently performing most necessary and desirable in-row tillage functions in most conditions. However, that advanced invention was in the form of a side-mounted machine, i.e., requiring special mounting brackets and procedures for mounting the machine on the side of a tractor. It became apparent after several years that users needed and wanted in row tiller machines that not only would have essentially all of the beneficial features, sensitivity, responsiveness, and functional effectiveness of the side-mounted machine disclosed in U.S. Pat. No. 4,518,043, but which could also have the convenience of mounting quickly and easily on a standard three-point hitch on the back of a tractor.

There were several earlier three-point hitch mounted rotary tillers, such as those shown in U.S. Pat. No. 3,138,208, issued to Simms; U.S. Pat. No. 3,419,086, issued to Giusti et al; and U.S. Pat. No. 3,190,364, issued to Maloney. However, none of these tillers provide all the desired combinations of features, control capabilities, and functions provided in the side-mounted Anderson et al machine of U.S. Pat. No. 4,518,043. More specifically, three-point hitch mounted tiller is desired that provides both lateral tilt and longitudinal pitch adjustment of the tiller, lateral position adjustment from the side of the tractor, longitudinal position adjustment, effective all-hydraulic retraction control with readily useable manual override, snag-free low profile for tilling around low bushy plants, depth control and float capabilities, and effective ground coverage tiller for more complete weed irradication.

SUMMARY OF THE INVENTION

Accordingly it is a general object of the present invention to provide a novel, improved and practical retractable tiller apparatus having the convenience of being easily mounted on a tractor's standard three-point hitch assembly and for tilling the interstitial unplanted soil around and between objects in a row as the tractor moves parallel to the row.

A more specific object of the present invention is to provide a three-point hitch mounted tiller that can be tilted from side to side and pitched forward and aft to adapt to slopes of the soil and to provide a more effective mounting structure for use of various tiller types.

Another object of the present invention is to provide a three-point hitch, mounted tiller in which the position of the tiller to the tractor can be adjusted laterally and longitudinally.

Yet another object of the present invention is to provide a simple and effective retractable tiller apparatus wherein the retraction and extension in and out of the row is easily operated by automatic sensing controls and can be easily overriden manually.

Still another object of the present invention is to provide a novel low-profile construction of the tiller head with an attached shroud so as to increase the tiller's effectiveness on low bushy plants while reducing its capacity for snagging.

Additional objects, advantages, and novel features of this invention are set forth in part in the description that follows, and in part will become apparent to those skilled in the art upon examination of the following specification or may be learned by the practice of the invention. The objects and advantages of the invention may be realized and attained by means of the instrumentalities and in combinations particularly pointed out in the appended claims.

To achieve the foregoing and other objects and in accordance with the purposes of the present invention, as embodied and broadly described herein, the apparatus of this invention may comprise a main frame attachable to the conventional three-point hitch of a tractor, an outrigger arm attached to the main frame and extending forwardly to a position at the side of the tractor, and rotary tool apparatus attached to the distal end of the outrigger arm. The outrigger arm is connected to the main frame in such a manner that it can pivot about three axes all orthogonal to each other with means for adjusting the outrigger about such axes as desired for spacing, tilt, and pitch control combinations as desired. The invention also includes low profile extension and retraction control and nesting structures, automatic extension and retraction with manual override control, and several advantageous tiller tool embodiments.

BRIEF DESCRIPTION OF THE DRAWINGS

The accompanying drawings, which are incorporated in, and form a part of, the specification illustrate the preferred embodiments of the present invention and together with the description serve to explain the principles of the invention.

In the drawings.

DETAILED DESCRIPTION OF THE PRESENT INVENTION

Figure 1:
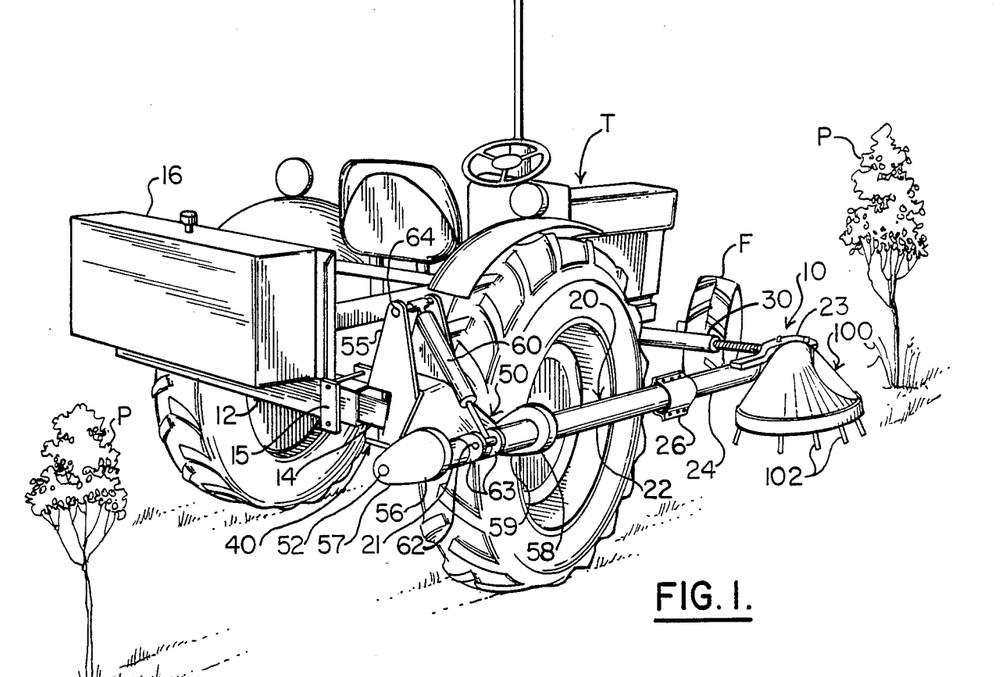
FIG. 1 is a perspective view of the retractable in-row tiller apparatus of the present invention mounted on the three-point hitch of a tractor.

The retractable tiller device 10 of the present invention is shown in FIG. 1 mounted on the standard three-point hitch at the rear of a tractor T for tilling around and between plants P in a row. Essentially, the retractable tiller device 10, as shown in FIG. 1, is comprised of a longitudinal outrigger arm 20 positioned along side a tractor T with rotary tiller apparatus 100 pivotally mounted on the distal end 23 of the longitudinal outrigger 20, and a main rear frame member 12 connected to the proximal end 21 of the outrigger arm 20 and transversing across the rear of tractor T. The main rear frame member 12 is releasably connectable to the standard three-point hitch on the rear of the tractor T, as will be described in more detail below. There is also a lateral support link 30 connecting the front or distal end 23 of the outrigger 20 to the side of the tractor for stability, support, and spacing, as will be described in more detail below. An oil reservoir 16 for hydraulic fluid necessary to operate the tiller is shown mounted conveniently on the rear frame member 12. The tiller 10 also includes tilt, pitch, retraction, and other controls for positioning the tiller apparatus 100 as desired, which controls will be described in more detail below.

Figure 2:
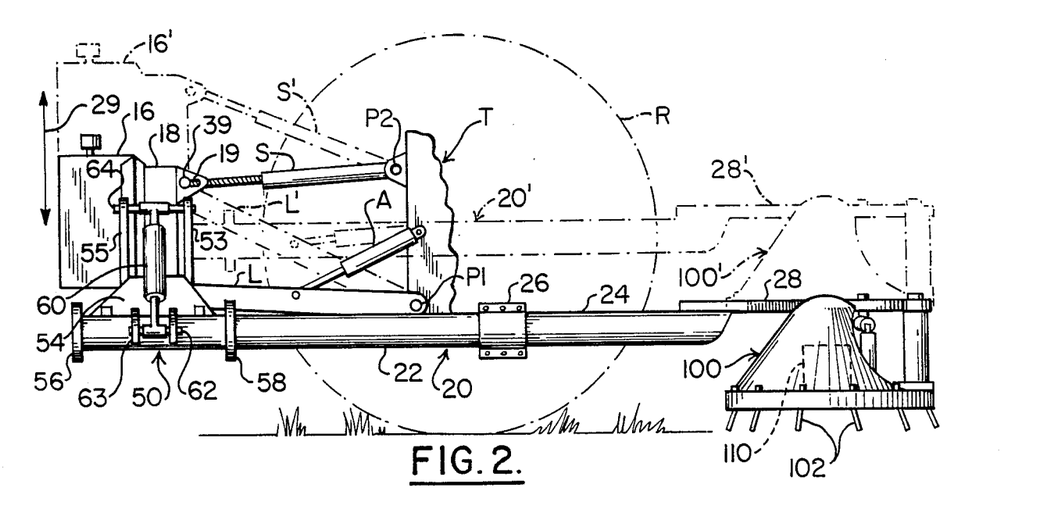
FIG. 2 is a side elevation view of the tiller with the broken lines denoting the tiller in its raised position.

The tiller apparatus 100 and several alternate embodiments thereof will also be described in more detail below. However, for present purposes and overall understanding of the apparatus, it is sufficient to say that the tiller apparatus embodiment 100, as shown in FIGS. 1 and 2, includes a plurality of downwardly extending ground-penetrating teeth 102 driven to rotate about a generally vertical axis by a hydraulic motor 110. The teeth 102 engage and till the ground to eradicate weeds, break up crusted soil, and aerate the ground.

Figure 4:
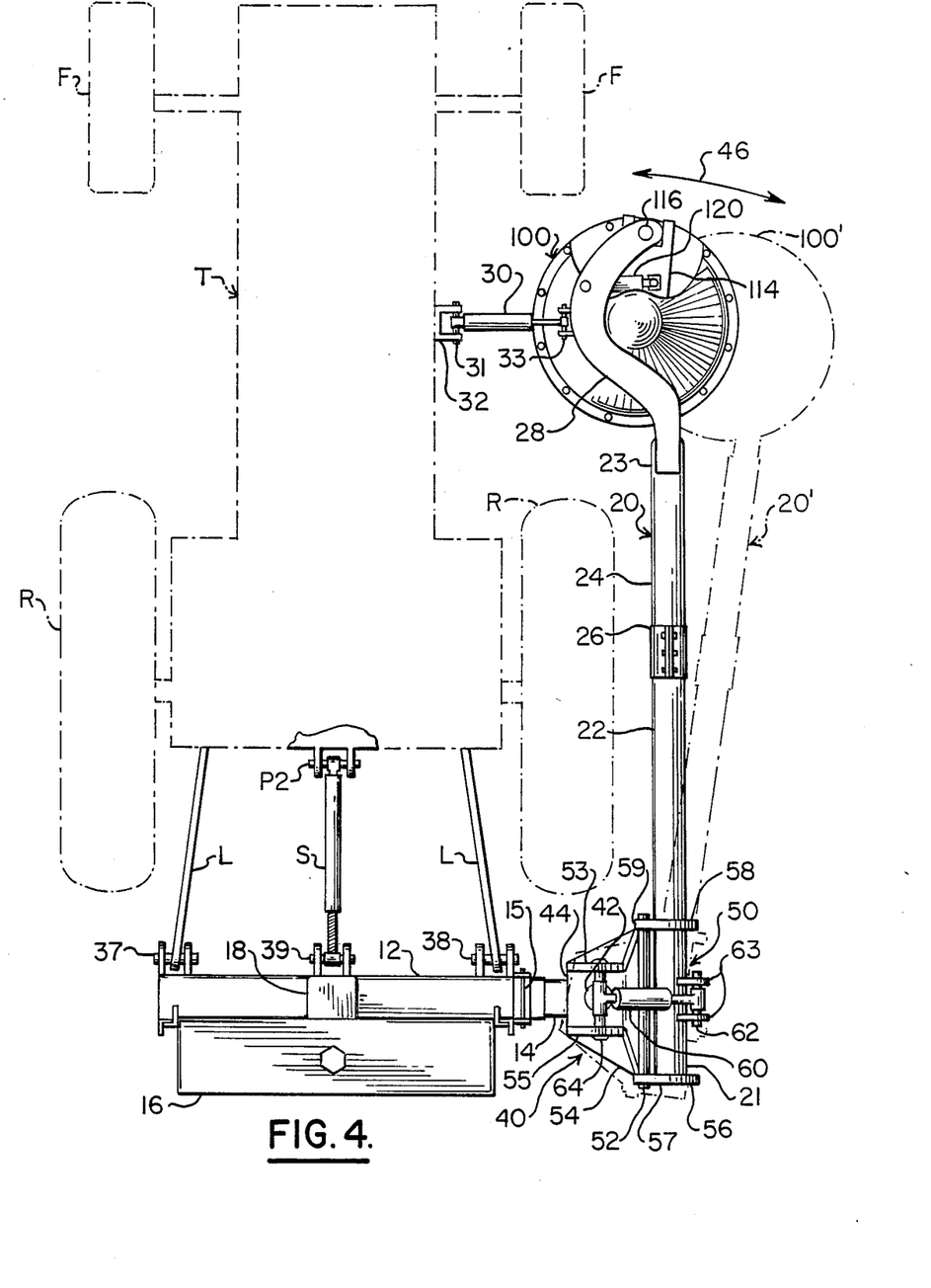
FIG. 4 is a plan view of the tiller with broken lines position.

As shown best in FIGS. 1, 2 and 4, the retractable tiller device 10 according to this invention is mounted on tractor T by a conventional three-point hitch, which has a pair of transversely spaced lift arms L and a control spacer link S, all attached pivotally to the superstructure of the tractor T at points P1 and P2, respectively. The spacer link S connection P2 to the tractor T is usually positioned between and above the lift arms L, and hydraulic actuating devices, such as cylinders A attached to the tractor T and lift arms L, are effective to move the distal ends of the lift arms L upwardly and downwardly as desired. The main rear frame member 12 is removably mounted on the distal ends of the lift arms by pins 37 and 38, which establishes the two main attachment points of the three-point hitch to the tiller device 10. The spacer link S is attached by pin 39 to the vertical frame member 18 a spaced distance above the pins 37, 38 to establish the third attachment point of the three-point hitch.

Figure 5:
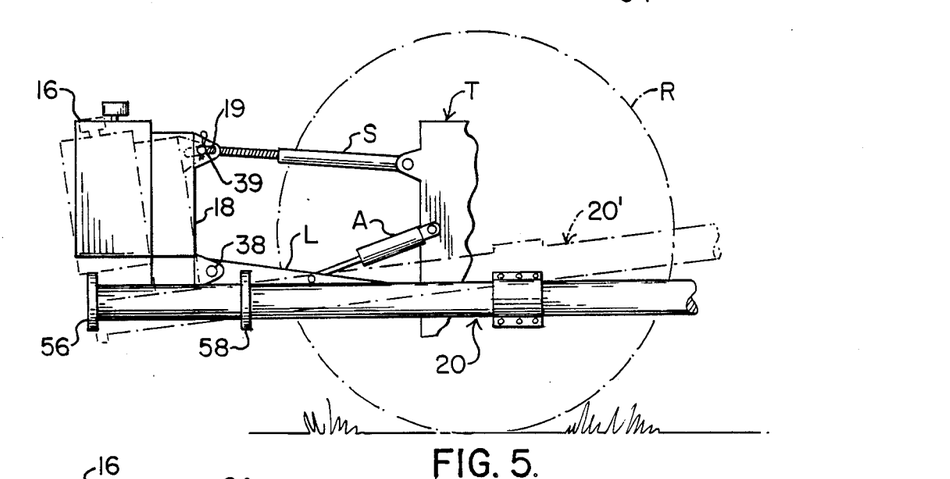
FIG. 5 shows a fragmentary view of the rear portion of the tiller shown in FIG. 2 with the broken lines showing the three-point attachment after the tiller has free-floated to a higher position to compensate for a raise in soil contour.

The spacer link S of the three-point hitch holds the top of vertical frame member 18 a fixed distance from the tractor T as the lift arms L lift the tiller device 10 upwardly and downwardly. Therefore, since vertical frame member 18 is a rigid upward extension of main frame 12, the outrigger arm 20 can maintain its same orientation generally parallel to the ground, as indicated by the phantom lines 20' in FIG. 2, when the lift arms L are moved upwardly to the position L'. Therefore, the tiller apparatus 100 can be lifted as illustrated at 100' by lifting the lift arms L of the three-point hitch. For a free float operation wherein the tiller can follow uneven ground contour or ride up over objects, the spacer link S can be connected to the vertical frame member 18 by pin 39 in a slotted hole 18, as shown in FIGS. 2 and 5, instead of in a standard round pin hole. When connected in this manner, the front of the outrigger arm 20 can rise, thus pivot about the lift arm attachment pins 37, 38, as illustrated by phantom lines 20' in FIG. 5, regardless of the height setting of the lift arms L of the three-point hitch.

Figure 11:
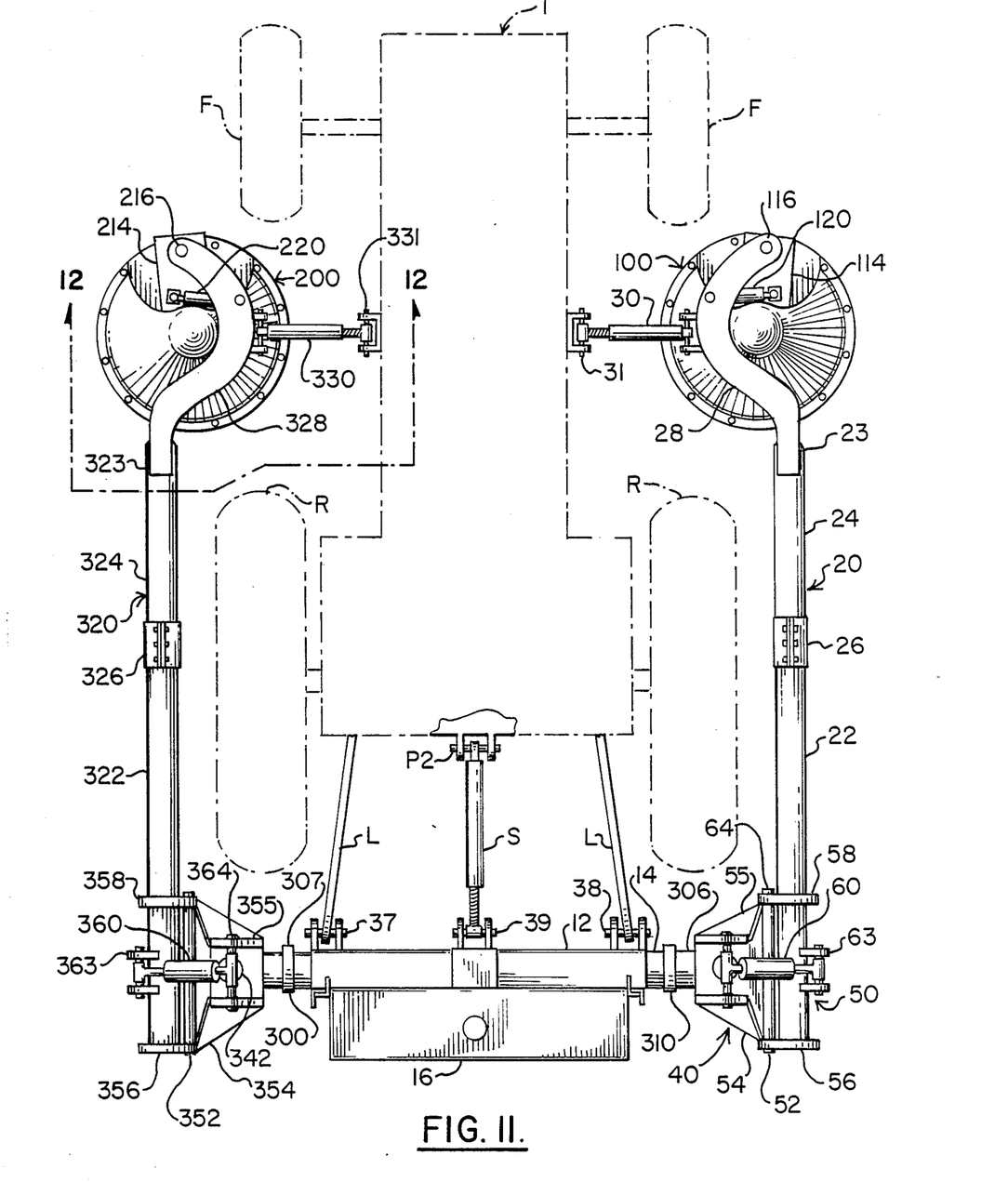
FIG. 11 is a top plan view similar to that of FIG. 4, but with two tillers according to this invention mounted with one tiller on each side of the tractor and both shown in their retracted positions.

The lateral position of the outrigger arm 20 in relation to the tractor T can also be adjusted for purposes of adapting the retractable tiller device 10 to the dimensional characteristics of the tractor T or to provide for proper spacing between rows of plants if two tillers are equipped on one tractor T, as shown in FIG. 11. Two lateral outrigger 20 adjustments are provided, one for the proximal end 21 and one for the distal end 23.

Figure 3:
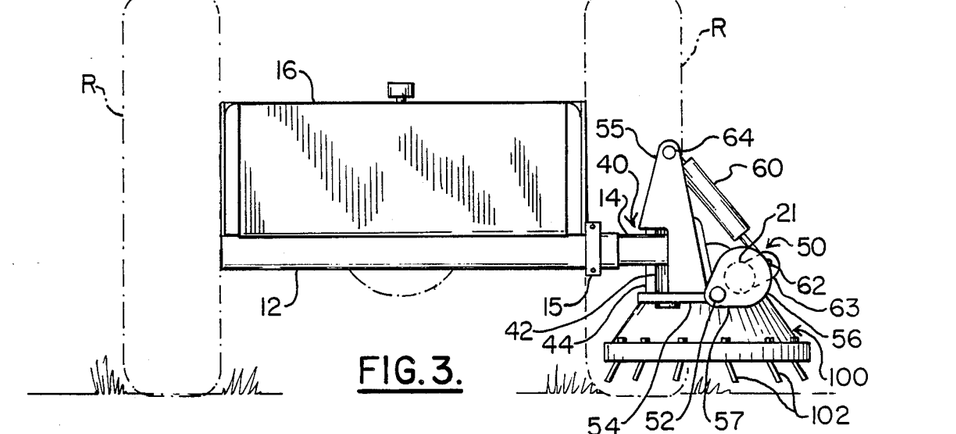
FIG. 3 is a rear elevation view of the tiller shown in its retracted lateral position and with the tiller head positioned horizontally.

The lateral adjustment for the proximal end is best seen by referring to FIGS. 1, 3, and 4. An end section 14 telescopes into and out of the hollow main rear frame member 12 and can be clamped in any desired position by clamp 15. This adjustment is primarily to fit the tiller device 10 to a particular tractor, such as giving it enough clearance around the rear wheel R. Once this adjustment is set initially for a particular tractor T, it is unlikely that it will have to be changed.

Referring to FIGS. 3 and 4, the lateral adjustment for the distal end 23 of outrigger arm 20 is made possible by the attachment of the outrigger arm 20 to the end section 14 of main rear frame member 12 with an attachment structure 40 that pivots about a vertical axis. Specifically, this pivotal attachment structure 40 has a frame 44 that is pivotally attached to the end section 14 by a vertical pivot pin 42. The proximal end 21 of outrigger arm 20 is connected to the frame 44 so that when it pivots about vertical pivot pin 42, the distal end 23 of outrigger arm 20 pivots outwardly, as illustrated in phantom lines 20' in FIG. 4, thus moving tiller apparatus 100 outwardly to the position shown at 100'.

The elongated front lateral support 30, which is connected to the side of the tractor T by a pivot pin 31 in bracket 32 and to the curved arm mount 28 on the distal end 23 of outrigger 20 by a pivot pin 33, maintains the desired spacing between the arm mount 28 and the tractor T. It is preferred that the length of this lateral support 30 is adjustable so that the spacing of the arm mount 28 from the tractor T can be adjusted as desired. This spacing adjustment is not the principle tiller retraction mechanism, which will be described below, so the lateral support 30 can be either a manually adjustable strut, such as a turnbuckle, or a power adjustable strut, such as a hydraulic cylinder. When the lateral support 30 is pivotally connected at both ends by pins 31, 33, as described above, it maintains the desired lateral spacing without interfering with the raising and lowering of the outrigger 20 and tiller apparatus 100 by the three-point hitch lift arms L.

The tiller device 10 also has a longitudinal adjustment for the purpose of adjusting the retractable tiller device 10 to the tractor 10. Referring to FIGS. 2 and 4, the length of the outrigger arm 20 can be lengthened or shortened longitudinally. The forward section 24 of outrigger 20 is made to slide into the rearward section 22 and is retained in a desired position by clamp 26. Therefore, the length of outrigger 20 can be adjusted by loosening and then retightening clamping sleeve 26 after telescoping the forward section 24 into or out of the rearward section 22 as desired.

When the clamp 26 is loosened, the forward section 24 can also be rotated with respect to the rearward section, thus providing some tilt adjustment for the tiller apparatus. However, the normal operation of the tiller device 10 often requires frequent changes or adjustment of the inward and outward tilt of the tiller apparatus 100, particularly when tilling berms and banks of soil around vines or trees and to optimize the tilling function of the tiller apparatus 100 in various soil conditions.

Figure 6:
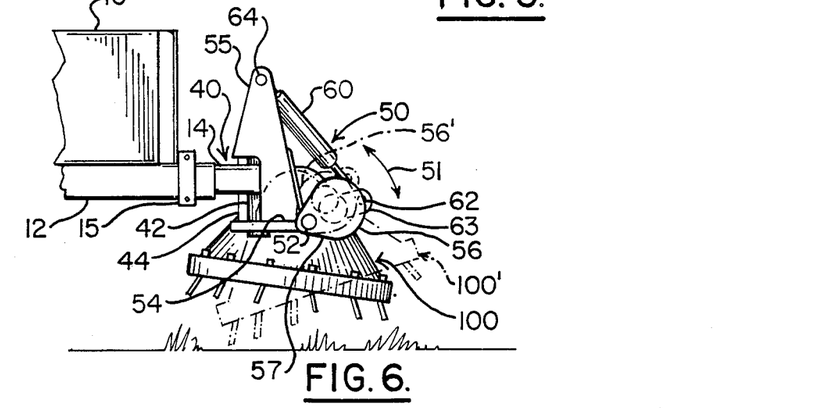
FIG. 6 is a fragmentary view of the tiller as shown in FIG. 3, with the outward edge of the tiller head tilted downward and with the broken lines depicting an alternate position with the outer edge of the tiller head tilted upwardly.

In order to better accommodate the need for easy and instantaneous tilt adjustment, the retractable tiller device 10 according to this invention has a novel tilting mechanism 50. As best seen in FIGS. 2, 4 and 6, the tilt control mechanism 50 includes a pivotal connection of the proximal end 21 of outrigger 20 to support frame 54 by a horizontal pivot pin 52. Two spaced apart mounting brackets 56, 58 on the distal end 21 of outrigger 20 have lobes 57, 59 extending radially outward from outrigger 20. The pivot pin 52 extends through the lobes 57, 59 of two mounting brackets 56 and 58 and through parts of frame 54. A hydraulic cylinder 60 is pivotally connected between the lobes 57, 59 and to the ears 62, 63 of frame 54.

As shown in FIG. 6, the extension or retraction of cylinder 60 causes the tiller apparatus 100 attached on the distal end 23 of the outrigger 20 to rotate about a horizontal axis extending through pivot pin 52 in the directions of arrow 51. Therefore, the tiller apparatus 100 can be tilted at various angles almost instantaneously. For example the tiller apparatus 100 is shown in FIG. 6 with its outside edge tilted downwardly, i.e., outward tilt, as the cylinder 60 is extended. Retraction of the cylinder 60 rotates or tilts the tiller apparatus 100 inwardly to a position with the inside edge titled downwardly, as shown in phantom lines 100' in FIG. 6. As mentioned above, this tilt feature is particularly useful for operating the tiller in applications, such as orchards or vineyards where the trees or vines are planted with relatively high berms or ridges in relation to the adjacent ground. This feature also provides for moving soil out of and into the row, i.e., hilling, berming, tearing down berms, etc. by tilting the tiller apparatus inwardly or outwardly.

Figure 7:
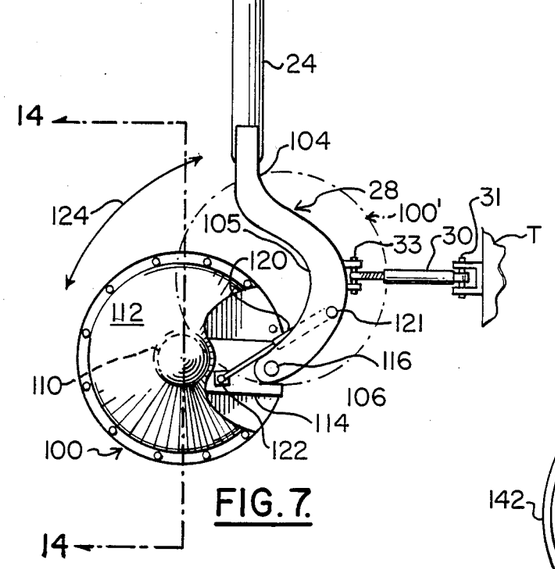
FIG. 7 is a fragmentary view of the tiller shown in FIG. 4 with the tiller head in its extended position and with the broken lines depicting the tiller head in its retracted position.
Figure 8:
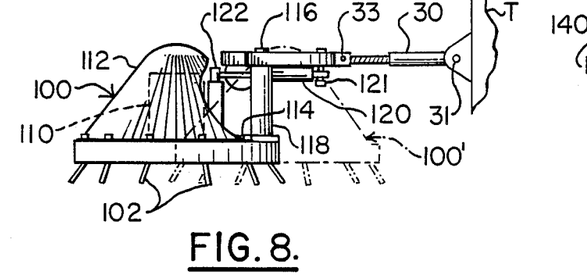
FIG. 8 is a fragmentary front elevation view showing the tiller head and its manually adjustable lateral support attachment connected to one side of the tractor and with the tiller shown in solid lines in its extended position and phantom lines showing an outline of the tiller head in its retracted position.

FIGS. 7 and 8 best show the operation and physical characteristics of the tiller apparatus 100. The end plate 28 is preferably curved with a bowed boomerang or question-mark shape. Its proximal end 104 is rigidly attached to the forward section 24 of the longitudinal outrigger 20. Also, the front lateral support 30 is attached approximately near the outer apex of the convex side of end plate 28. The tiller apparatus 100 is pivotally attached to the distal end 106 of the end plate 106 so as to swing freely about substantially vertical pivot pin 116. Hydraulic cylinder 120 is pivotally mounted at one end to end plate 28 by pin 121 and at its other end to the frame plate 114 of tiller apparatus 100. FIG. 7 shows the normal operating position of the tiller apparatus 100 as it is extended outwardly into a row of plants (not shown) when the cylinder 120 is extended. The retracted position of the tiller apparatus 100', indicated by phantom lines in FIG. 7 is shown as cylinder 100 is retracted to move the tiller 100 out of a row.

Thus, the automatic or manual extension and retraction of the tiller apparatus into and out of a row of plants is accomplished by the cylinder 120 pivoting the tiller apparatus 100 about vertical pivot pin 116, as indicated by arrow 124 in FIG. 7, through an angle of about 90 degrees. This pivotal retraction and extension is very effective when the tiller is pivoted to extend at a position laterally outward from the vertical pivot pin 116 at the distal leading end 106 of the curved arm 28 and to retract to a position longitudinally trailing the pivot pin 116. During the retraction motion rearwardly and inwardly about the pivot pin 116, the rearward component of this motion tends to offset the forward motion of the tractor T and tiller 100, thus resulting in an effective slowing of forward advance toward the plant as the tiller 100 moves out of the row. This effective slowing allows more precision tilling near the plant while minimizing the chances of damage to the plant. On the other hand, when the plant has been cleared by the tiller, the forward component of the extending swing motion tends to accelerate the tiller 100 past the plant and back into the row immediately without skipping or leaving excessive untilled ground on the trailing side of the plant.

The curved end plate 28 accommodates this optimum swinging lateral extension and trailing retraction motion exceptionally well while maintaining a desired low profile of the outrigger 20 and end plate 28, which is important to avoid snags while tilling under and around low, bushy plants, pine trees, spruce trees, and the like. The contoured shroud 112 covering the hydraulic motor 110 and other less smooth operating components of the tiller glides the tiller 100 under branches, and when retracted nests compactly in the open space adjacent the concave side 105 of the curved end plate 28 directly trailing the pivot pin 116. This structure allows a lower profile position of the outrigger 20 than would otherwise be possible, which, as mentioned above, is very desirable for many situations.

Figure 14:
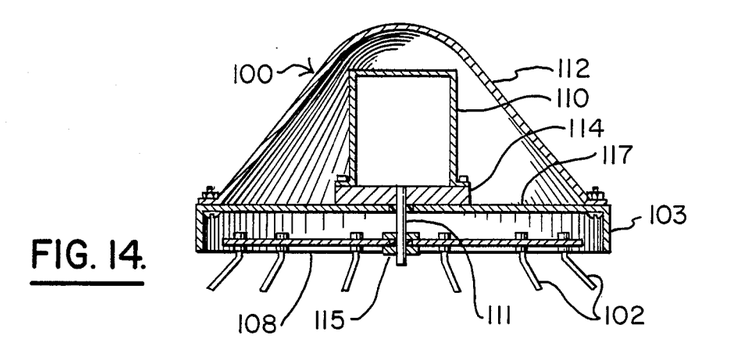
FIG. 14 is a transverse vertical section through the tiller tool on line 14—14 of FIG. 7.

As shown in FIGS. 7, 8 and 14, the tiller apparatus 100 includes a short motor mount plate 114 pivotally attached to pivot pin 116 and with a hydraulic motor 110 mounted on the plate 114 outwardly from the pivot pin 116. The shaft 111 of the hydraulic motor 110 extends below mounting plate 114 and through a hole 113 in cover 117 and is attached to a rotor 108 with an appropriate coupling or hub 115. A plurality of elongated cultivator teeth 102 extend downwardly from the periphery of the rotor 108 in a spaced-apart relationship to each other. The cultivator teeth 102 are adapted to penetrate and till the ground as rotor 108 is rotated by pressurized hydraulic fluid (not shown) being supplied to the hydraulic motor 110. An edge guard 103, in combination with the contoured, generally conical shaped shroud 112 forms a protective cover to prevent the tiller head from snagging on plants. The flanged end along the bottom of the shroud 112 is secured around the outer periphery on the top surface of mounting plate 114 while edge guard 103 is secured on its bottom surface. As a result, tiller head 100 has the desired structure of a snag-free, low profile for tilling around low bushy plants.

Figure 9:
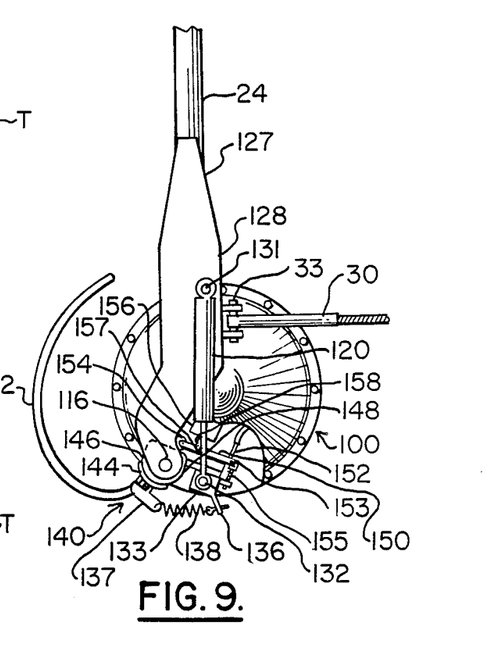
FIG. 9 is a top plan fragmentary view of an alternate embodiment of a tiller mounting structure shown with the tiller in its retracted position and with a plant sensing arm and its associated mechanical components used to retract the tiller head automatically around plants.

FIG. 9 shows a higher profile embodiment wherein the end plate 128 is not curved, but extends more straight forward from the front 24 of outrigger 20 and over the top of the tiller apparatus 100. FIG. 9 along with FIG. 10 also shows a novel hydraulic control system for controlling the extension and retraction motion of the tiller apparatus 100. According to this invention, the extension and retraction of the tiller head 100 can be controlled automatically by a sensor mechanism 140. This sensor mechanism includes a sensor arm 142, which is positioned to contact a plant P in proximity to the tiller apparatus 100. Upon contacting plant P as the tractor T and tiller apparatus 100 continue their forward motion, the sensor arm 142, which is attached to the half sleeve 144 and thereby bolted to cam 146 by bolts 161, 162, begins to pivot about pin 116 to rotate cam 146. As the cam 146 rotates the cam lobe 148 pushes lever 150 toward hydraulic valve 156. The lever 150 has a cam follower roller 154 at one end positioned against the cam 146, and it is pivotally attached at the other end by pin 153 to a manual control cable 152. The midportion of the lever 150 is attached by pin 157 to the actuator rod 158 of valve 156.

Figure 10:
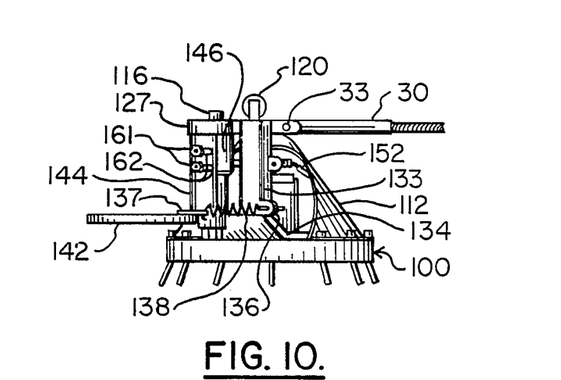
FIG. 10 is a front elevation fragmentary view of the tiller mounting structure shown in FIG. 9.

Consequently, as the lobe 148 pushes lever 150 toward the valve 156, the lever 150 pivots around pin 153, which acts as a fulcrum and pushes actuator rod 158 into valve 156. This chain of events causes valve 156 to feed hydraulic fluid to the cylinder 120, which is attached at one end by pin 131 to end plate 128 and at the other end by pin 132 to the rigid vertical strut 133 of tiller frame member 134. The fluid so fed to the cylinder 120 thus pushes strut 133 forwardly causing the tiller 100 to pivot about vertical pin 116 and retract out of the row away from the plant P. As the sensor arm 142 then clears the plant P, a spring 138 anchored by ear 136 to the strut 133 and by link 137 to the half sleeve 144 forces the sensor arm 142 outwardly to await contact with the next plant P. As the sensor arm 144 returns outwardly, the cam 146 rotates in a reverse direction to return to its normal position, thus causing the cylinder 120 to extend and pivot the tiller 100 about pin 116 back into the row of plants P.

Alternatively, if the operator decides to actuate retraction manually without waiting for the sensor arm 142 to do so, he can manipulate a knob (not shown) near the driver's seat on the tractor T that is connected to the control cable or rod 152. The cable or rod 152 pulls the lever 150 toward valve 156. In this case, however, the cam follower 154 acts as the fulcrum, bearing against the inactive cam 146 as the lever 150 pushes rod 158 to actuate valve 156. Therefore, this sensor control mechanism 140 provides a very sensitive, hydraulic operating system with convenient manual override of the automatic retraction with a very simple and reliable integrated system.

Figure 12:
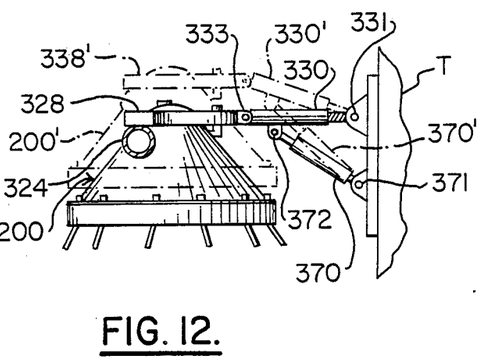
FIG. 12 is a front elevation fragmentary view of an alternate embodiment of the adjustable lateral support attachment of the present invention combined with a vertical cylinder depth and pitch control that can raise the tiller head to an elevated position, as shown in phantom lines.
Figure 13:
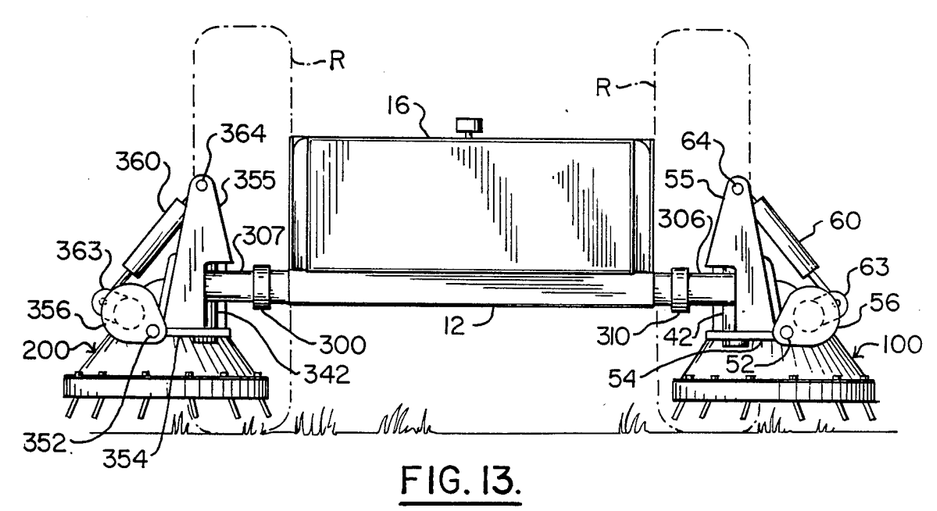
FIG. 13 is a rear elevation view of the dual tiller arrangement shown in FIG. 11.

FIGS. 11, 12, and 13 show a modified version of the present invention with two independent tillers 100, 200, mounted on opposite sides of the tractor T. Since the ground terrain usually varies differently on opposite sides of the tractor T, independent control is required for each tiller 100, 200. Therefore, the tiller structures in this embodiment have been modified to provide more independent and more varied depth, tilt, and pitch control for each individual tiller 100, 200. The main tiller components, including the outrigger arm 20, tilt control 50, tiller apparatus 100, and pivotal mounting 40 to the main frame 12 are essentially the same as those described above. However, in this embodiment, the pivotal mounting 40 of the frame members 54, 55 are attached to a short strut 306. The strut 306, is rotatably connected to the telescoping section 14 by a connector 310 that allows the strut 306 to rotate in relation to the member 14 about a horizontal axis that is essentially aligned with the longitudinal axes of both the strut 306 and the member 14. Therefore, the distal end 23 of the outrigger 20 can rotate upwardly and downwardly about the longitudinal axis of strut 306 and member 14, thus allowing the tiller 100 to move upwardly and downwardly in relation to the tractor T, regardless of the position lift arms L of the three-point hitch. With this embodiment, the pin 39 connecting the main frame 12 to the spacer link S of the three-point hitch can be in an ordinary pin hole instead of a slotted hole as described above.

The tiller structure illustrated in FIG. 11 on the left side of the tractor T is essentially a mirror image of the tiller structure on the right side. Specifically, the left outrigger arm 320 is comprised of a forward section 324 and a rearward section 322 clamped together by clamp 326. When the clamp 326 is loose, the forward section 324 can be telescoped into and out of the rear section 322, and it can be rotated with respect to the rear section 322 as well. Therefore, as described above for the tiller on the right side of the tractor, the length of the outrigger arm 320 can be adjusted and set as desired to fit the particular tractor T on which it is mounted, and the initial tilt setting for the tiller apparatus 200 can also be adjusted and set in this manner. Also, as described for the right tiller, this left tiller has the rear portion 322 of the outrigger arm 320 pivotally connected by pivot pin 352 and brackets 356, 358 of the outrigger 320 and to the pivot frame 354. Hydraulic cylinder 360 is attached at one end to the outrigger 320 by pin 363 and at the other end by pin 364 to the riser portion 355 of frame 354. Therefore, the lateral tilt of the tiller apparatus 200 can be adjusted at will by operating the cylinder 360.

This left tiller also has lateral spacing adjustment similar to the right tiller, comprising the pivotal frame member 354 pivotally connected to the strut 307 by a vertical pivot pin 342 and an elongated front lateral support arm 330 connected between the end plate 328 and the tractor T.

Also as described above for the right tiller 100, the left tiller apparatus 200 is pivotally mounted by a vertical pin 216 to a curved or bowed end plate 328 that extends outwardly from the distal end 322 of outrigger 320. Therefore, when the cylinder 220, which is attached to the mounting plate 214, retracts the tiller 200 inwardly toward the tractor T, the upper portion of the tiller apparatus 200 can nest in the open space trailing the pivot pin 216 along a line that extends approximately through the longitudinal axis of outrigger arm 320 and pivot pin 216. The extended position, of course, as described for the right tiller apparatus 100 extended laterally outwardly from the pivot pin 216 as shown in FIGS. 7 and 8.

The depth control and raising and lowering of the tillers 100, 200 in this embodiment can best be described by reference to FIGS. 11, 12, and 13. For convenience, this feature will be described by referring to the left tiller 220, although it is recognized that the same description applies to the right tiller 100. Therefore, the illustration in FIG. 12 is of the left tiller 200, while it could just as easily have been of the right tiller 100. As described above for the right tiller mounting, the strut 307 connecting the pivotal frame 354 to the main rear frame 12 has a rotatable connection 300 so that the distal end 323 of outrigger 320 can move up and down freely with no constraint from the three-point hitch.

The raising and lowering and depth control of the tiller apparatus 200 in this embodiment is provided by the hydraulic cylinder 370, as best seen in FIG. 12, which is connected between the tractor T and the bottom of the front lateral support 330. Specifically, the front lateral support 330 can be an adjustable link, such as the turnbuckle arrangement shown in FIG. 12, or it can be a separate hydraulic cylinder itself, as described above for the preferred embodiment. The lateral support 330 is illustrated in FIG. 12 as being pivotally connected to the frame of the tractor T by a pivot pin 331 and to the end plate 328 by a pivot pin 333.

The lift control cylinder 370 is shown with one end mounted to the tractor T by a pivot pin 371 a spaced distance below the mounting of the lateral support 330 to the tractor T. The lift control cylinder 370 extends at an angle upwardly and outwardly from its pivotal connection 371 on the tractor T to a pivotal connection 372 on the bottom of the lateral support 330. Therefore, extension of the rod of cylinder 370 pushes upwardly on the lateral support 30 causing it to move upwardly to the position 330' shown in phantom lines in FIG. 12. As the lateral support 330 moves upwardly, it raises the entire tiller apparatus 200 as shown in phantom lines 200'. As mentioned above, this upward movement is possible because of the rotatable connection 300 of the strut 307 to the rear main frame member 12.

Hydraulic control levers (not shown) can be positioned near the operator on the tractor T so that the operator can conveniently raise and lower the tiller 200 as desired. The hydraulic circuit can also include a free float condition, depth control modulation in relation to the hydraulic pressure driving the hydraulic motor of the tiller, or a modified downward pressure/float condition. A hydraulic circuit that can be used for these features is described in the co-pending patent application Ser. No. 684,843, filed Dec. 21, 1984, now U.S. Pat. No. 4,660,649, so it is not considered necessary to describe it again here.

Figure 15:
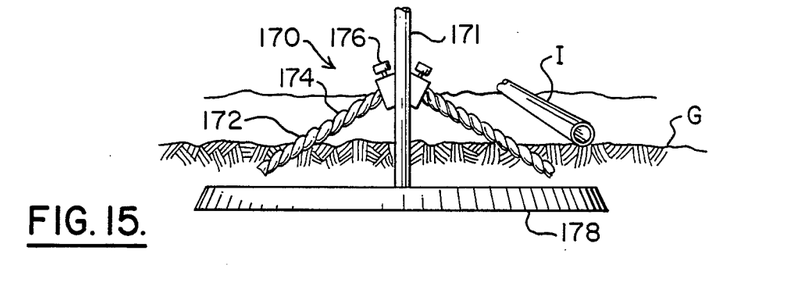
FIG. 15 shows an alternate embodiment tiller tool structure.

An alternate embodiment tiller structure 170 is shown in FIG. 15. This tiller structure 170 can replace the rotor 108 and teeth 102 disclosed in FIG. 14. In this tiller embodiment 170, a vertical shaft 171, which can be connected to the shaft 111 of the hydraulic motor 110 shown in FIG. 14, has a flat circular disk or knife 178 mounted on the bottom thereof and adapted for moving several inches under the surface of the ground to cut off weeds at that depth. A plurality of short pieces of steel cable 172 attached to the shaft 171 by set screws 176 in sleeves 174 extend outwardly and downwardly from the shaft 171 to a position over the knife 178. These cables 172 are preferably of a large enough gage to be stiff enough to stir and till the ground above the knife 178, yet semi-flexible enough to provide constant stirring motion in the soil. This tiller embodiment 170 is particularly useful when tilling in fields equipped with drip line irrigators I, because they can undercut weeds under the drip line I and stir up the soil adjacent the drip line without interfering with or tangling with the drip line I.

Figure 16:
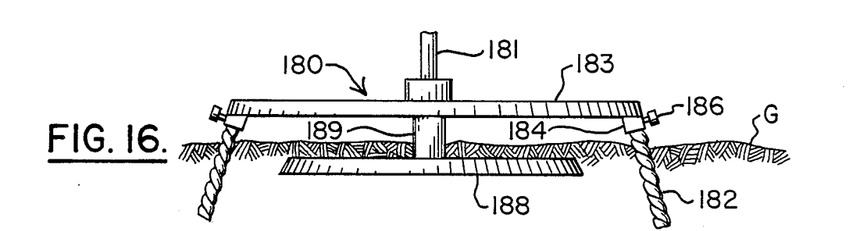
FIG. 16 shows another alternate embodiment tiller tool structure.

Another tiller embodiment 180 is shown in FIG. 16. This tiller embodiment includes a rotor 183 mounted on a shaft 181, which shaft 181 can be connected to the motor shaft 111 of hydraulic motor 110 shown in FIG. 14 in place of the rotor 108 illustrated therein. In this embodiment 180, the semi-rigid cable teeth 182, similar to those described above for embodiment 170 in FIG. 15, are attached to and extend substantially downwardly from the periphery of the rotor 183. The cable teeth 182 are mounted to the rotor 183 by sleeves 184 and set screws 186. The flat circular knife 188 is mounted by a journal bearing 189 a spaced distance below the rotor 183 and adapted to slide along several inches under the surface of the ground G to cut off any weeds and other vegetation encountered. The rotor 183 rotates about the axis of shaft 181 and drives the teeth 182 through the ground in a rotary manner to break up and stir the ground ahead of and behind the knife 188. It is preferred in this embodiment that the knife 188 be mounted by a journal bearing 189 so that it is free to rotate or not to rotate independently of the rotation of the rotor 183 and shaft 181. In other words, as the rotor 183 rotates the cable teeth 182 around the periphery of the knife 188, the knife 188 essentially slides through the ground in a nonrotary manner or perhaps turning one way or the other as the soil slides against the periphery of the rotor. In this manner, the knife 188 is not forced to rotate by the shaft 181 or by the rotor 183, but essentially acts independently.

Figure 17:
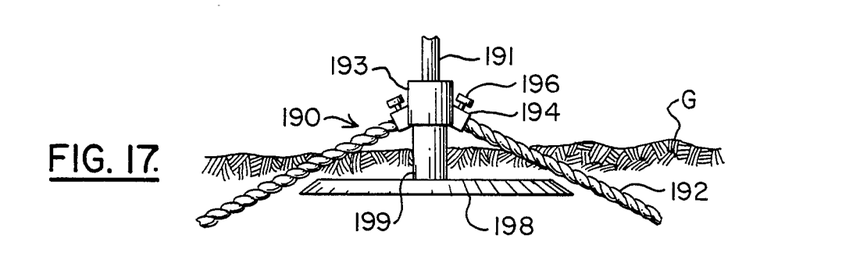
FIG. 17 shows still another alternate embodiment tiller tool structure.

Another alternate embodiment rotor 190 is shown in FIG. 17. This tiller embodiment 190 is similar to that disclosed in FIG. 15, but with several variations. The knife 198 is journaled to the shaft 191 by a journal bearing 199 so that it can rotate or not rotate freely without being driven by the shaft 191. The cable teeth 192 on the other hand are attached by sleeves 194 and set screws 196 to a block 193, which is rigidly attached to the shaft 191. Therefore, the shaft 191 drives the teeth 192 in a rotary manner around the periphery of the knife 198, while the knife 198 slides along several inches under the surface of the ground G.

Figures 18, 20:
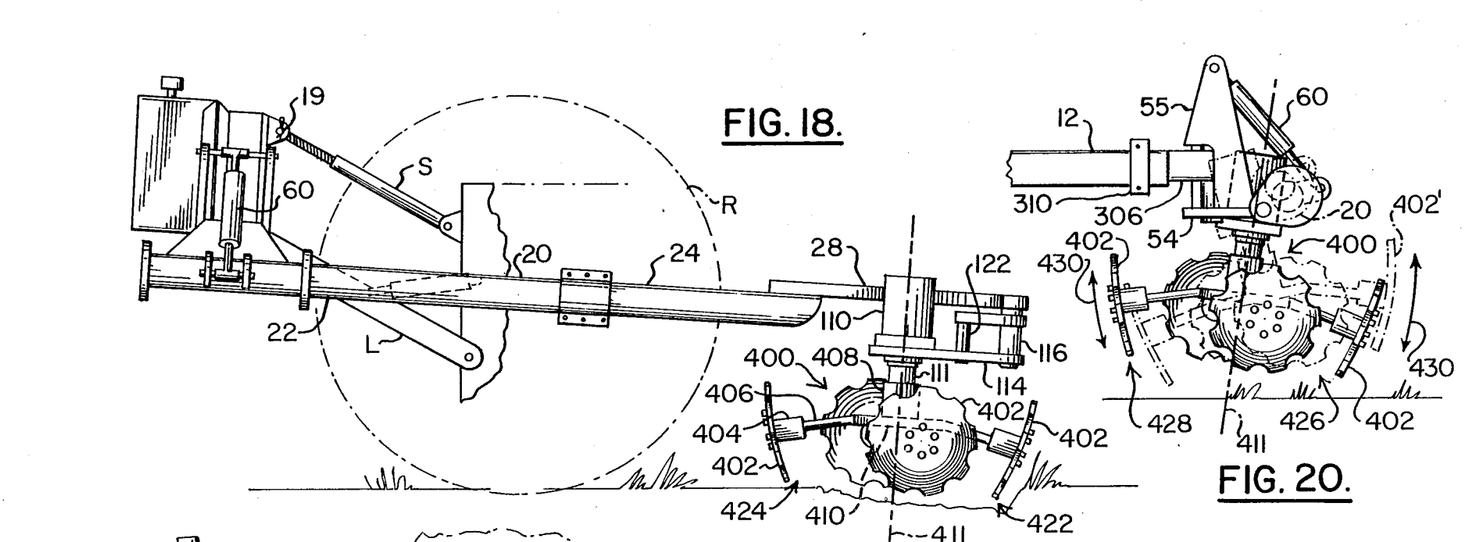
FIG. 18 shows an alternate embodiment rotary disk tiller tool mounted on a support structure such as that shown in FIGS. 11 and 12 with the lift cylinder down and the three-point hitch up to illustrate a forward pitch on the disk tiller.
FIG. 20 is a view similar to FIG. 6, but with the alternate embodiment rotary disk tiller mounted to illustrate left and right tilt on the disk tiller.
Figure 19:
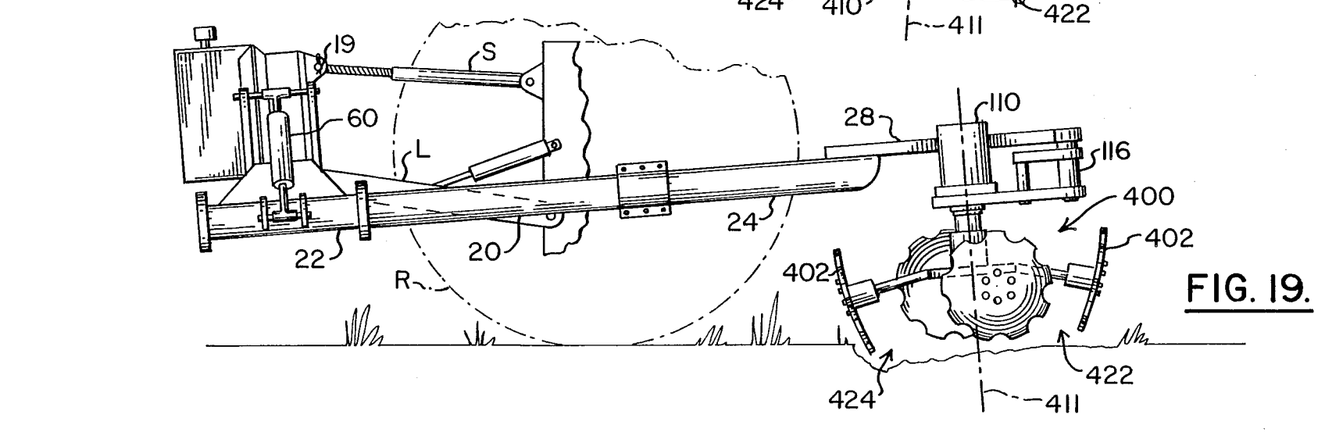
FIG. 19 is a view similar to that in FIG. 18, but with the lift cylinder up and the three-point hitch down to illustrate a rearward or aft pitch on the disk tiller.

A particularly advantageous combination of structure and features according to this invention is illustrated in FIGS. 18, 19, and 20. In this embodiment, the tiller device 10, is basically the same structure as that disclosed in FIGS. 11, 12, and 13, except that a different tiller apparatus 400 is shown mounted on the motor 110. The tiller apparatus 400 of this embodiment essentially comprises a plurality of dish shaped disks 402 with journal bearing hubs 404 mounted for free rotation on the distal ends of shafts 406. The shafts 406 are rigidly attached to, and extend outwardly from, the periphery of a rotary plate 410 on the bottom of hub 408. The hub 408 is attached to the shaft 111 of motor 110 so that the motor rotates the plate 410 about a generally vertical longitudinal axis extending through the motor shaft 111. Each disk shaft 406 is attached to the plate 410 at a position laterally offset from the longitudinal axis 411 so that the disks tend to lead the normal rotational path of the tiller causing a more aggressive cut in the ground as the disks rotate about the axis 410. The disks shafts 406 and also preferably canted slightly downwardly, which also enhances the tilling action of the disks in the soil causing the disks to turn up the ground more aggressively, particularly on the disks positioning in a manner trailing the axis 411. As mentioned above, each disk 402 is journaled by a bearing 404 to rotate freely on the rigid shaft 406, so that it is the action of the ground bearing on the disk as the tractor moves forwardly and the motor 110 orbits the disks about the axis 411 that causes the disks 402 to rotate on the shafts 406.

Referring now to FIG. 18 in combination with the lift and depth control mechanism described and illustrated in FIG. 12, it can be seen that when the lift arms L of the three-point hitch are raised upwardly and the lift cylinder 370 is retracted downwardly, the result is that the outrigger arm 20 is canted or sloped with its rear portion 22 up in relation to its front portion 24, which is down. As a result, the tiller apparatus 400 is pitched forwardly, i.e., the disks 402 ahead of the axis 411 cut into the ground more deeply at position 422 than the disks at 402 positioned rearwardly of the axis 411 as indicated at 424.

On the other hand, referring to FIG. 19 in combination with FIG. 12, when the lift arms L of the three-point hitch are lowered and the lift cylinder 370 is extended or raised, the outrigger arm 20 is canted or sloped upwardly with the front portion 24 raised substantially higher than rear portion 22. In this configuration, the tiller apparatus 400 is pitched rearwardly, i.e., the disks 402 cut into the ground substantially deeper when they are behind the axis 411, as indicated at 424, than the disks 402 positioned forward of the axis 411, as indicated at 422.

FIG. 20 illustrates the tilt control capability of the present invention as already described above for the tiller apparatus 100. Essentially, the tilt control cylinder 60 can be extended to tilt the tiller 400 outwardly so that the disks 402 outboard of the axis 411 cut deeper as indicated at 426 than the disks 402 inboard of the axis 411 as indicated at 428. Alternatively, when the tilt control cylinder 60 is retracted, the tiller apparatus 400 is tilted in the opposite direction inwardly as illustrated in phantom lines 402', so that the disks 402' on the inboard side of axis 411 cut in the ground more deeply than the disk 402' outboard of the axis 411. In other words, extension or retraction of the tilt cylinder 60 causes the tiller apparatus 400 to tilt inwardly or outwardly as indicated by arrows 430 in FIG. 20.

As can be appreciated from the illustrations in FIGS. 18, 19, and 20, the tiller apparatus according to this invention affords virtually complete omnidirectional adjustable control for the tiller 400 from forward pitch to rearward pitch and from outward tilt to inward tilt for any desired action of the tiller apparatus 400. It can also be appreciated that any combination of these pitches and tilts can be achieved simultaneously as desired. For example, if it is desired to cut a straight line in a tilled area along the edge of sod when the tractor is driven on the sod, the tiller apparatus 400 can be tilted inwardly and pitched rearwardly at the same time to achieve a clean cut along the edge of the sod. On the other hand, if the same effect is desired when the tractor is traveling in the tilled area instead of on the sod, the tiller 400 can be pitched rearwardly and tilted outwardly. If it is desired to reverse the direction of travel of the tractor, the same effects can be obtained by pitching the tiller 400 forwardly with the desired combination of tilt inwardly or outwardly.

In another application, pitching forward and tilting outward pushes soil to build a berm, and changing directions can tear down a berm. Many other applications that can also be made of these unique omnidirectional pitch and tilt controls will be recognized by operators of this machine. At the same time, the depth control features and the retraction and extension features described above can all be used together with the pitch and tilt controls to achieve desired results. In other words, the tiller apparatus according to this invention provides more valid and complete orientation and tillage control than has been available in tiller apparatus before.

The foregoing description is considered as illustrative only of the principles of the invention. Further, since numerous modifications and changes will readily occur to those skilled in the art, it is not desired to limit the invention to the exact construction and processes shown and described above. Accordingly, all suitable modifications and equivalent may be resorted to falling within the scope of the invention as defined by the claims which follow.

The embodiments of the invention in which an exclusive property or principle is claimed are defined as follows:

1. Tool apparatus adapted for detachable mounting on a conventional three-point hitch apparatus of a tractor, wherein said three-point hitch apparatus has a longitudinal axis that extends forward in the normal direction of travel of the tractor and aft in the opposite direction and includes two lift arms spaced apart from each other, each lift arm having a proximal and a distal end, respective pivotal connections at which the respective proximal ends of said two lift arms are pivotally connected to the rear end of the tractor in such a manner that the two lift arms extend rearwardly from the rear end of the tractor in generally the same direction as the longitudinal axis of the three-point hitch apparatus and in such a manner that the distal ends of the lift arms are moveable upwardly and downwardly in relation to the longitudinal axis of the three-point hitch apparatus, a rigid, elongated spacer link pivotally attached to, and extending rearwardly from, a point about midway between, and upwardly from, said pivotal connections of the lift arms to the tractor, and lift drive means for moving the distal ends of the lift arms upwardly and downwardly, said tool apparatus comprising:
- a main frame member having three-point hitch connecting means for connecting the main frame member to the three-point hitch apparatus of the tractor, said three-point hitch connecting means having a longitudinal axis that extends forward and aft through said three-point hitch connecting means and is adapted to extend in the same direction as the longitudinal axis of the three-point hitch apparatus of the tractor when the main frame member is connected to the three-point hitch apparatus of the tractor;
- an elongated outrigger arm having a proximal end connected to the main frame member, a distal end positioned generally forwardly of the main frame member, and an outrigger longitudinal axis extending through said proximal and distal ends of the outrigger arm;
- a working tool attached to the distal end of said outrigger arm; and
- tilt control means connected to said outrigger arm for rotating said outrigger arm for causing said working tool to pivot in selectively opposite directions about a tilt axis that extends in substantially the same direction as said outrigger longitudinal axis to tilt the working tool laterally inwardly toward and outwardly away from the longitudinal axis of the three-point hitch connecting means.

2. The tool apparatus of claim 1, wherein said tilt control means includes tilt pivot axis connection means for connecting said outrigger arm to said main frame member in such a manner that said outrigger arm can pivot about said tilt axis and tilt drive means for pivoting said outrigger arm about said tilt axis.

3. The tool apparatus of claim 2, wherein said tilt pivot axis connection means includes two longitudinally spaced apart brackets extending radially outwardly from the proximal end of said outrigger arm, a tilt pivot bracket attached to said main frame member, and a tilt pivot pin extending through said radially extending brackets and through said tilt pivot bracket, and wherein said tilt drive means includes a hydraulic cylinder connected at one end to said tilt pivot bracket and at the other end to a tilt cylinder bracket rigidly attached to, and extending radially outwardly from, said outrigger arm.

4. The tool apparatus of claim 2, including lateral position adjusting means connected to said outrigger arm for adjusting and maintaining the lateral spacing of said working tool from the longitudinal axis of said three-point hitch connecting means.

5. The tool apparatus of claim 4, wherein said lateral position adjusting means includes vertical pivot axis connecting means for connecting said outrigger arm to said main frame member in such a manner that said outrigger arm can pivot about a generally vertical axis that extends substantially perpendicular to the outrigger longitudinal axis and lateral support means pivotally connected to the distal end of the outrigger arm for fixing the lateral distance between the longitudinal axis of the three-point hitch connecting means and said working tool.

6. The tool apparatus of claim 5, wherein said vertical pivot axis connecting means includes a substantially vertical lateral position pivot pin that pivotally connects said tilt pivot bracket to said main frame member, and wherein said lateral support means is an elongated rigid lateral support member, the length of which is adjustable.

7. The tool apparatus of claim 6, wherein said elongated rigid lateral support member is a manually adjustable turnbuckle.

8. The tool apparatus of claim 6, wherein said elongated rigid lateral support member is a hydraulic cylinder.

9. The tool apparatus of claim 6, including vertical position control means for controlling the vertical position of the working tool in relation to said longitudinal axis of the three-point hitch connecting means.

10. The tool apparatus of claim 9, wherein said vertical position control means includes rotatable connecting means for connecting the proximal end of said outrigger arm to said main frame member in such a manner that said outrigger arm can rotate about a substantially horizontal axis that extends generally transverse to the longitudinal axis of the three-point hitch connecting means and generally perpendicular to the outrigger longitudinal axis.

11. The tool apparatus of claim 10, wherein said vertical position control means includes a hydraulic cylinder pivotally mounted at one end at a fixed position with respect to the longitudinal axis of the three-point hitch connecting means and a vertically spaced distance from the elongated rigid lateral support member and at the other end to the lateral support member adjacent said distal end of said outrigger arm.

12. The tool apparatus of claim 11, wherein said working tool includes a tool drive motor with a generally vertical drive shaft powered to rotate by the motor and a rotary tool connected to said vertical drive shaft to rotate about a generally vertical axis.

13. The tool apparatus of claim 12, wherein said rotary tool includes a rotor disk with a plurality of ground-engaging teeth attached to, and extending downwardly from, the rotor disk.

14. The tool apparatus of claim 13, wherein said rotary tool also includes a flat circular knife positioned a spaced distance under said rotor disk and connected to said rotor disk in such a manner that it can rotate independently of the rotation of the rotor disk.

15. The tool apparatus of claim 12, wherein said rotary tool includes a generally vertical tool shaft connected to, and driven by, said drive shaft, a plurality of semi-rigid cable teeth, each cable tooth having a proximal end and a distal end and being attached at its proximal end to, and extending at an angle outwardly and downwardly from, said generally vertical tool shaft, and a circular knife mounted on, but rotationally independent of, said generally vertical tool shaft a spaced distance under said cable teeth.

16. The tool apparatus of claim 15, wherein the distal ends of said cable teeth extend downwardly to positions above said circular knife.

17. The tool apparatus of claim 15, wherein said cable teeth extend downwardly to positions below said circular knife.

18. The tool apparatus of claim 12, wherein said rotary tool includes a generally vertical support shaft fastened to said drive shaft and defining a generally vertical axis of rotation of said rotary tool, a plurality of axle shafts, each of said axle shafts having a proximal end, a distal end, and a longitudinal axis extending through the proximal and distal ends, the proximal ends of said axle shafts being rigidly attached to, and extending generally horizontally outward from, said support shaft to the respective distal ends, and a dished-shaped rotary disk journaled for free rotation on the distal end of each of said axle shafts.

19. The tool apparatus of claim 18, including a widened plate rigidly affixed to said support shaft for rotation about said generally vertical axis of rotation of said rotary tool, and wherein said proximal ends of said axle shafts are rigidly attached to said plate in such a manner that the longitudinal axes of said axle shafts are generally tangential to a circle concentric with, but larger in diameter than, said support shaft.

20. The tool apparatus of claim 19, wherein said axle shafts extend at a downwardly canted angle from a plane including said circle.

21. The tool apparatus of claim 12, including an elongated support member having a proximal end rigidly affixed to the distal end of said outrigger arm, said elongated support member extending longitudinally outward from the distal end of said outrigger arm to a distal end of said support member, said support member having a curved shape such that its midsection bows around an open space between its proximal and distal ends in general alignment with the outrigger longitudinal axis, said working tool having a short motor mount plate with the drive motor mounted on one end of the short motor mounted plate and the other end of the short motor mount plate being pivotally attached to the distal end of said support member by a generally vertical tiller mount pivot pin such that the drive motor and rotary tool can be swung about a generally vertical axis defined by said tiller mount pivot pin between a position where the drive motor and rotary tool occupy said open space longitudinally rearward of the tiller mount pivot pin and a position spaced laterally outward from the tiller mount pivot pin.

22. The tool apparatus of claim 21, including retraction and extension drive means for swinging said motor and rotary tool from a retracted position nested in said open space to an extended position spaced laterally outward from the tiller mount pivot pin.

23. The tool apparatus of claim 12, wherein said working tool includes a short motor mount plate with the drive motor mounted on one end of the short motor mount plate and the other end of the short motor mount plate being pivotally attached to the distal end of the outrigger arm by a generally vertical tiller mount pivot pin such that the drive motor and rotary tool can be swung about a generally vertical axis defined by said tiller mount pivot pin between a retracted position and an extended position in lateral relation to the longitudinal axis of the three-point hitch connecting means, retraction and extension drive means connected to said short motor mount plate for swinging said drive motor and rotary tool between the retracted and extended positions, actuating means for actuating said retraction and extension drive means, cam means rotatably mounted to rotate about the generally vertical axis of said tiller mount pivot pin and having a cam lobe on its peripheral surface, an elongated sensor arm rigidly attached to and extending radially outward from said cam means and adapted to contact plants in the vicinity of the rotary tool, an elongated actuator lever connected at its midsection to said actuating means, one end of said actuator lever being positioned adjacent said cam means and having a cam follower thereon for bearing against the peripheral surface of the cam means, and a control rod pivotally attached to the other end of said actuator lever.

24. The tool apparatus of claim 23, including bias means attached to said cam means for biasing said sensor arm outwardly from the rotary tool and for biasing said cam lobe away from said cam follower.

25. The tool apparatus of claim 24, including a sleeve attached to said cam means in such a way that the sleeve can rotate in relation to the cam means, releasable locking means for fixing the sleeve to the cam means, said sensor arm being rigidly attached to and extending from said sleeve.

* * * * *

UNITED STATES PATENT AND TRADEMARK OFFICE
CERTIFICATE OF CORRECTION

PATENT NO. : 4,936,390

DATED : June 26, 1990

INVENTOR(S) : Anderson, J., et. al.

It is certified that error appears in the above-identified patent and that said Letters Patent is hereby corrected as shown below:

In column 1, line 47, "wanted in row" should read --wanted in-row--.

In column 3, line 9, after "lines" insert --denoting the tiller's front in its extended lateral--.

In column 15, line 49, change "mounted" to --mount--.

Signed and Sealed this

Third Day of September, 1991

Attest:

HARRY F. MANBECK, JR.

*Attesting Officer*    Commissioner of Patents and Trademarks